C. H. DEDERER.

Horn Button.

No. 9,528. Reissued Jan. 4, 1881.

Witnesses:
Charles R. Searle.
W. C. Forbes

Inventor:
Charles H. Dederer
By C. H. Forbes
Attorney.

N. PETERS, PHOTO-LITHOGRAPHER, WASHINGTON, D. C.

UNITED STATES PATENT OFFICE.

CHARLES H. DEDERER, OF JERSEY CITY, NEW JERSEY.

HORN BUTTON.

SPECIFICATION forming part of Reissued Letters Patent No. 9,528, dated January 4, 1881.

Original No. 224,399, dated February 10, 1880. Application for reissue filed July 19, 1880.

*To all whom it may concern:*

Be it known that I, CHARLES H. DEDERER, of Jersey City, in the county of Hudson and State of New Jersey, have invented a new and useful Improvement in Horn Buttons; and I do hereby declare that the following is a full, clear, and exact description thereof, reference being had to the accompanying drawings, forming a part of this specification, in which—

Figure 1:
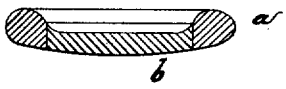
Figure 2:
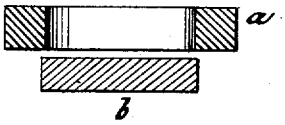

Figure 1 represents a view, in cross-section, showing the construction of a button embodying my invention, and Fig. 2 a view, in cross-section, of a blank of the separable parts.

Similar letters of reference indicate corresponding parts in each figure.

This invention consists in a horn button constructed of a circumferential ring and a separate center piece or filling, said ring being cut transversely from the horn, so that the end grain appears upon its face surface, the center piece or filling being cut in a similar manner from a portion of the horn, or longitudinally from the sides, as desired.

In the drawings, *a* represents the circumferential ring, and *b* the center piece or filling. The ring *a* is obtained from the hollow portion of the horn by cutting the same transversely into blanks of the desired thickness, the center piece or filling, *b*, being cut from the tip or solid portion or from the sides of the hollow part. These parts are then turned up and fitted together, the center piece or filling, *b*, being made made of slightly larger diameter than the aperture of the ring *a*. The ring *a* is then expanded by subjecting it to heat, preferably dipping it in hot oil. The center piece or filling, *b*, is then inserted, the contraction of the ring in cooling firmly retaining the parts together. The button is then turned, polished, and finished in the usual manner.

By this invention a portion of the horn is utilized in a manner to produce buttons of large size, increased durability, and improved appearance.

The circumferential ring *a*, with its end grain presented on its face surface, and the center piece or filling, *b*, cut from the tip or other portion of the horn, produce a handsome contrast, which may be varied by selection. This construction is also particularly adapted to the process described in securing the parts together, the ring *a*, when cut in the manner set forth, being shrunk upon the center piece uniformly and effectively.

Having thus fully described my invention and the manner of carrying the same into effect, I wish it to be understood that I do not claim a button made in two separate parts; neither do I claim a solid button cut from a material so that its end grain appears upon its face surface; but

What I do claim, and desire to secure by Letters Patent, is—

A horn button composed of a circumferential ring, *a*, and a center piece or filling, *b*, fitted therein, said circumferential ring being cut transversely from the horn, whereby its end grain is presented to the face surface, as set forth.

CHARLES H. DEDERER.

Witnesses:

CHAS. W. FORBES,
W. A. FORBES.